(12) United States Patent
Mine et al.

(10) Patent No.: US 7,244,067 B2
(45) Date of Patent: Jul. 17, 2007

(54) OPTICAL CONNECTOR

(75) Inventors: Keiji Mine, Osaka (JP); Hiroshi Nakagawa, Kyoto (JP); Takeshi Isoda, Osaka (JP)

(73) Assignee: Hosiden Corporation, Osaka (JP)

( * ) Notice: Subject to any disclaimer, the term of this patent is extended or adjusted under 35 U.S.C. 154(b) by 76 days.

(21) Appl. No.: 11/219,002

(22) Filed: Sep. 1, 2005

(65) Prior Publication Data
US 2006/0051032 A1    Mar. 9, 2006

(30) Foreign Application Priority Data
Sep. 8, 2004    (JP) .............................. 2004-260882

(51) Int. Cl.
*G02B 6/36*    (2006.01)
(52) U.S. Cl. .............................. 385/88; 385/89; 385/92
(58) Field of Classification Search ................. 385/14, 385/49, 88–92
See application file for complete search history.

(56) References Cited

U.S. PATENT DOCUMENTS

| | | | |
|---|---|---|---|
| 5,071,219 A | * | 12/1991 | Yurtin et al. .................. 385/78 |
| 6,499,889 B1 | * | 12/2002 | Shirakawa et al. ........... 385/88 |
| 2003/0147602 A1 | | 8/2003 | Takada |
| 2004/0264887 A1 | * | 12/2004 | Rosenberg et al. ........... 385/92 |
| 2006/0204183 A1 | * | 9/2006 | Ishikawa ..................... 385/88 |

FOREIGN PATENT DOCUMENTS

| | | |
|---|---|---|
| JP | 07294777 | 11/1995 |
| JP | 2000-304980 | 11/2000 |
| JP | 2004 053764 | 2/2004 |

* cited by examiner

*Primary Examiner*—Hemang Sanghavi
(74) *Attorney, Agent, or Firm*—David N. Lathrop, Esq.; Gallagher & Lathrop

(57) ABSTRACT

An optical connector to be connected to an optical plug holding optical fibers includes: a light-emitting element; a light-receiving element; and sleeves that optically connect the light-emitting element and the light-receiving element to optical fibers of the optical plug, respectively, in which a transmission sleeve and a reception sleeve are connected to each other via a link section to form a sleeve unit. The sleeve unit is secured by press-fitting the link section into a connector body. A stress caused by the press fitting is not exerted to the transmission sleeve and the reception sleeve, so that the optical functions (optical properties) of the sleeves can be prevented from being compromised by the stress.

6 Claims, 13 Drawing Sheets

OPTICAL CONNECTOR

BACKGROUND OF THE INVENTION

The present invention relates to an optical connector for two-way optical communications. In particular, it relates to an optical connector that comprises a light-emitting element, a light-receiving element, and sleeves that optically connect the light-emitting element and the light-receiving element to optical fibers of an optical plug.

Figure 1A:
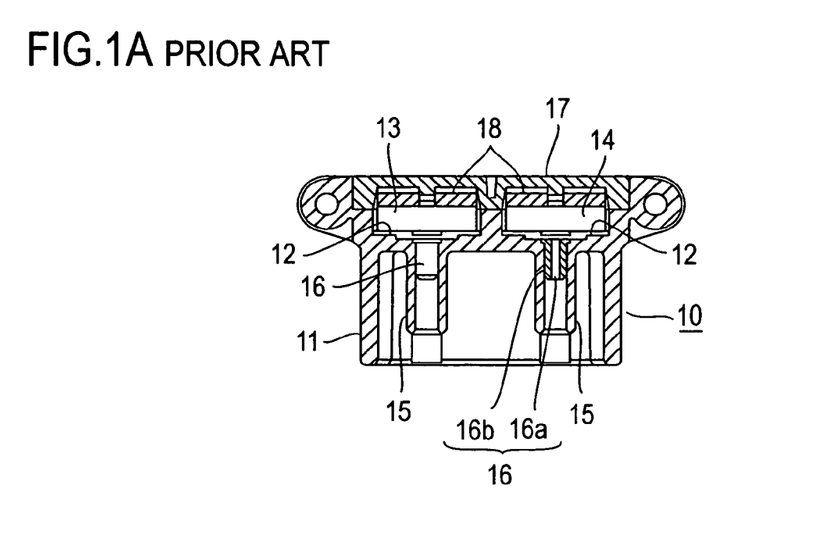
FIG. 1A is a cross-sectional view of a conventional optical connector.
Figure 1B:
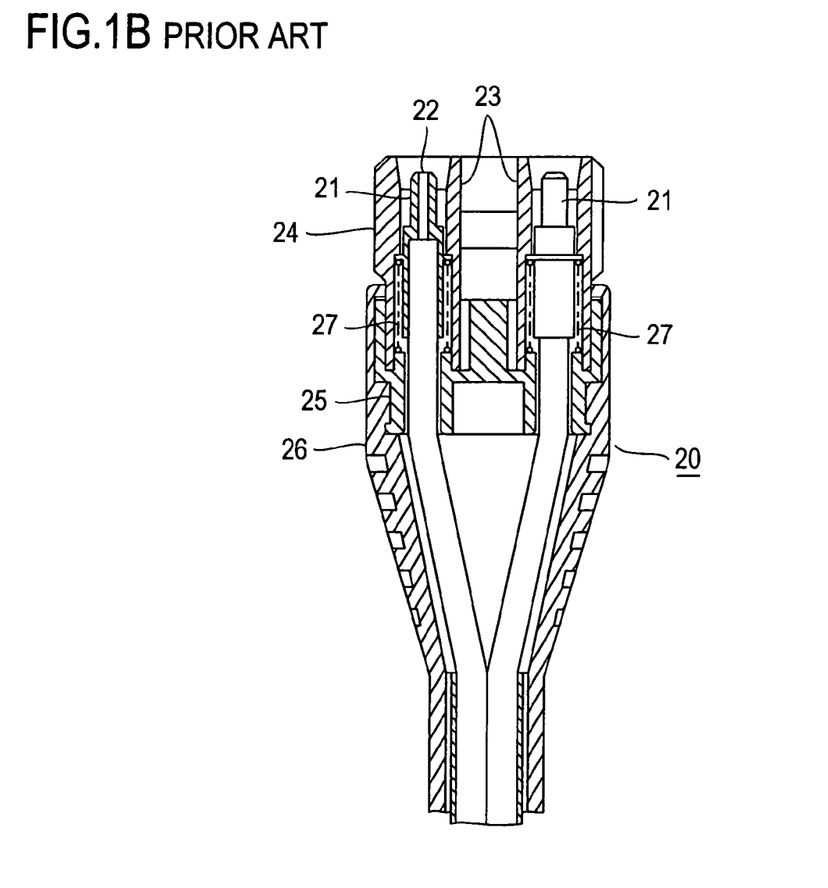
FIG. 1B is a cross-sectional view of an optical plug to be connected to the optical connector shown in FIG. 1A.
Figure 2A:
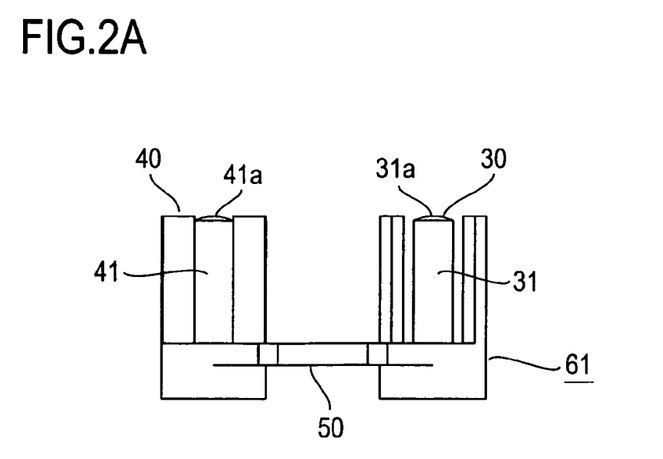
FIG. 2A is a plan view of a sleeve unit of an optical connector according to a first embodiment of the present invention.
Figure 2B:
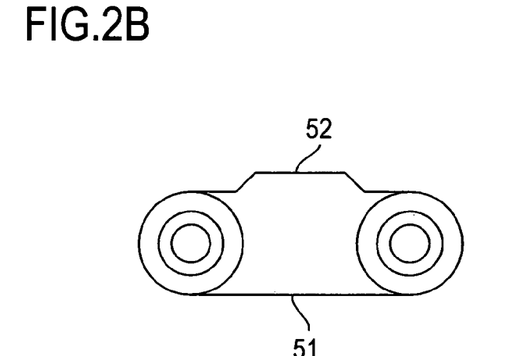
FIG. 2B is a front view of the sleeve unit shown in FIG. 2A.
Figure 2C:
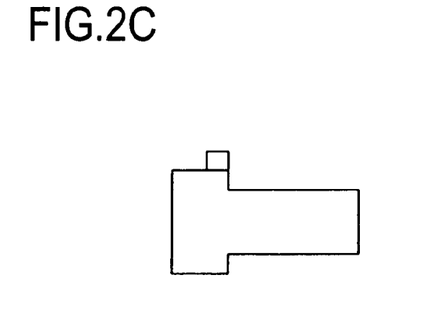
FIG. 2C is a right side view of the sleeve unit shown in FIG. 2B.
Figure 2D:
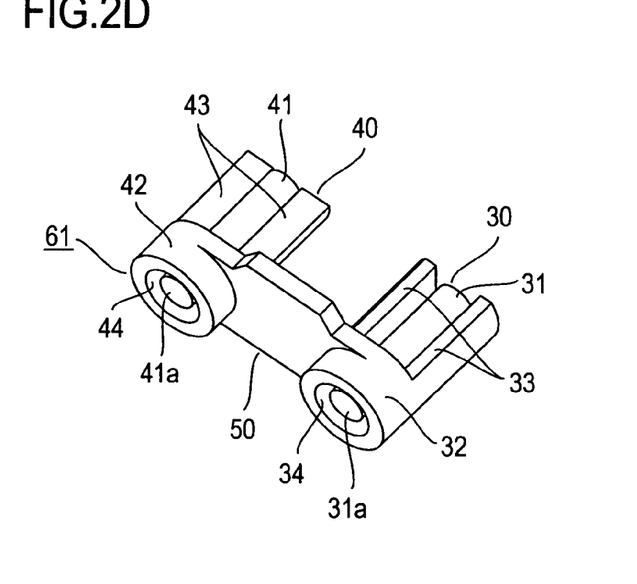
FIG. 2D is a perspective view of the sleeve unit shown in FIGS. 2A to 2C.

As an example, FIGS. 1A and 1B show a conventional optical connector for two-way optical communications described in Japanese Patent Application Laid Open No. 2000-304980 (issued on Nov. 2, 2000, referred to as literature 1 hereinafter). FIG. 1A shows an optical connector (receptacle) on an apparatus, and FIG. 1B shows an optical plug to be fitted to the optical connector.

A housing 11 of an optical connector 10 has a pair of storage sections 12, each of which houses either of a light-emitting element module (a transmission module) 13 and a light-receiving element module (a reception module) 14. In front of each of the storage sections 12, a receiving tube 15 extending frontward is provided, and a sleeve 16 is fitted into each receiving tube 15. In FIG. 1A, reference numeral 17 denotes a cap fitted on the rear of the optical connector 10, and reference numeral 18 denotes back sheets supporting the light-emitting element module 13 and the light-receiving element module 14.

On the other hand, as shown in FIG. 1B, an optical plug 20 comprises a pair of optical fibers 22 each having a ferrule 21 attached to the front end thereof, a housing 24 having tubular walls 23 each housing and protecting one ferrule 21, a spring cap 25 fitted onto and fixed to the housing 24, and a boot 26 fitted to the rear of the spring cap 25. In FIG. 1B, reference numeral 27 denotes springs that bias the ferrules 21 frontward.

When the optical plug 20 structured as described above is fitted into the optical connector 10 structured as described above, the paired ferrules 21 each holding one optical fiber 22 are inserted into the corresponding receiving tubes 15, and the front surface of each ferrule 21, at which the end face of the optical fiber 22 is exposed, faces the front surface of the sleeve 16 fitted in the receiving tube 15 with a small gap therebetween. Thus, the optical fibers 22 are optically connected to the light-emitting element module 13 and the light-receiving element module 14 via the sleeves 16. Here, the sleeves 16 are composed of a light-propagating optical fiber 16a housed and fixed in a cylindrical holder 16b.

As described above, according to the prior art, the sleeves are each composed of the light-propagating waveguide (optical fiber) housed in the cylindrical holder and inserted into the receiving tube in the housing of the optical connector. For insertion, the sleeves are press-fitted into the receiving tubes for positioning and securing. Thus, a problem may arise that a stress is caused by the pressing and exerted on the waveguides, thereby compromising the optical property of the waveguides.

Besides, in the literature 1 described above, there are described a sleeve composed of a waveguide having an integral guide section at one end, and a sleeve unit composed of a transmission sleeve with such a guide section and a reception sleeve with such a guide section which are connected via a link section. In any case, the guide section surrounding the waveguide is press-fitted and secured in a receiving tube, and thus, there is a possibility that a stress caused by the press fitting affects the optical function of the waveguide, as in the case described above.

SUMMARY OF THE INVENTION

In view of the problems described above, an object of the present invention is to provide an optical connector in which a stress caused by press fitting of a sleeve is prevented from being exerted on the sleeve, thereby protecting the optical function of the sleeve from the stress.

According to the present invention, there is provided an optical connector to be connected to an optical plug holding optical fibers, comprising: a light-emitting element; a light-receiving element; and sleeves that optically connect the light-emitting element and the light-receiving element to optical fibers of the optical plug, respectively, in which a transmission sleeve and a reception sleeve are connected to each other via a link section to form a sleeve unit, and the sleeve unit is secured by press-fitting the link section into a connector body.

According to the present invention, the transmission sleeve and the reception sleeve are incorporated into the connector body by press fitting and securing of the link section that connects the transmission sleeve and the reception sleeve to each other. Thus, a stress caused by the press fitting is not exerted to the transmission sleeve and the reception sleeve, so that the problem that the stress compromises the optical functions (optical properties) of the sleeves can be avoided.

DETAILED DESCRIPTION OF THE PREFERRED EMBODIMENTS

In the following, embodiments of the present invention will be described.

Figure 3A:
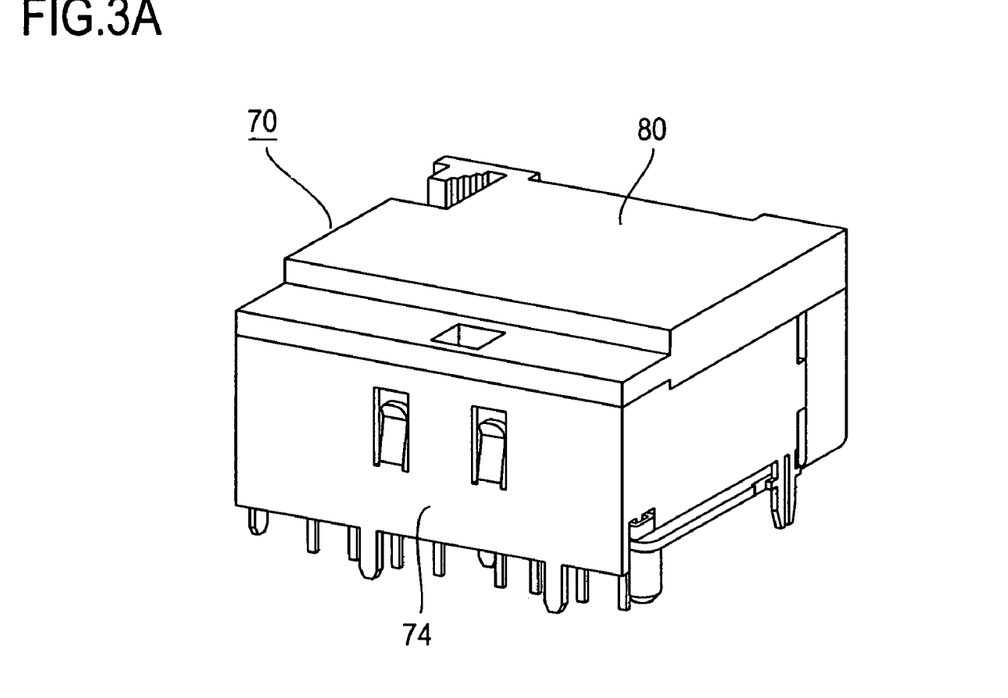
FIG. 3A is a perspective view of the optical connector according to the first embodiment of the present invention viewed from the rear thereof.
Figure 3B:
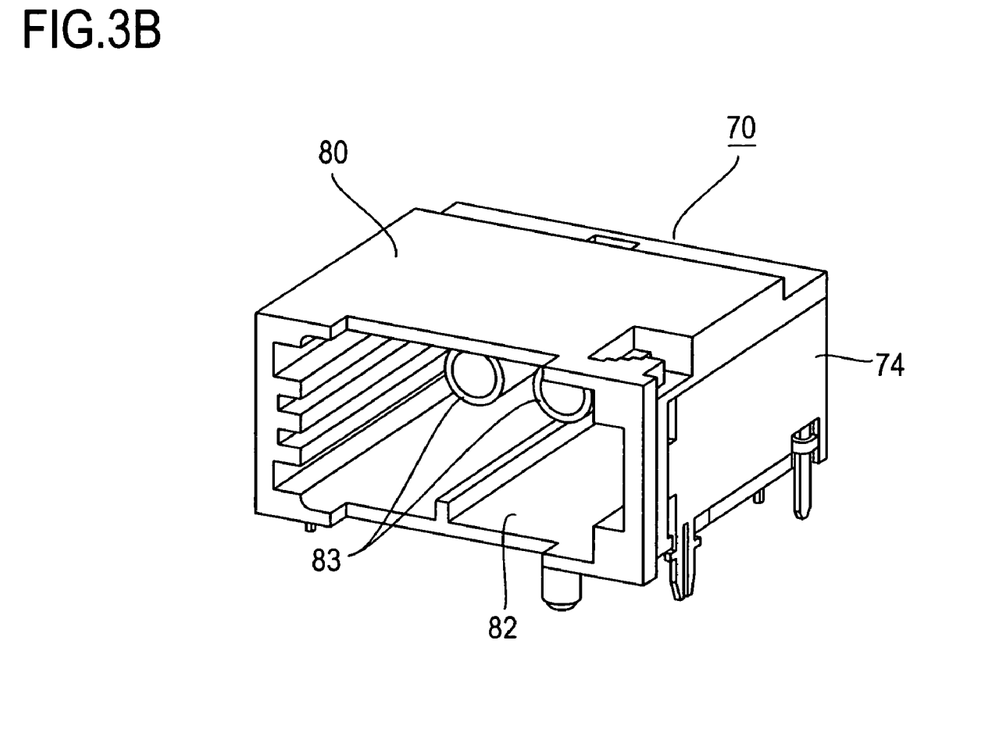
FIG. 3B is a perspective view of the optical connector shown in FIG. 3A viewed from the front thereof.
Figure 4:
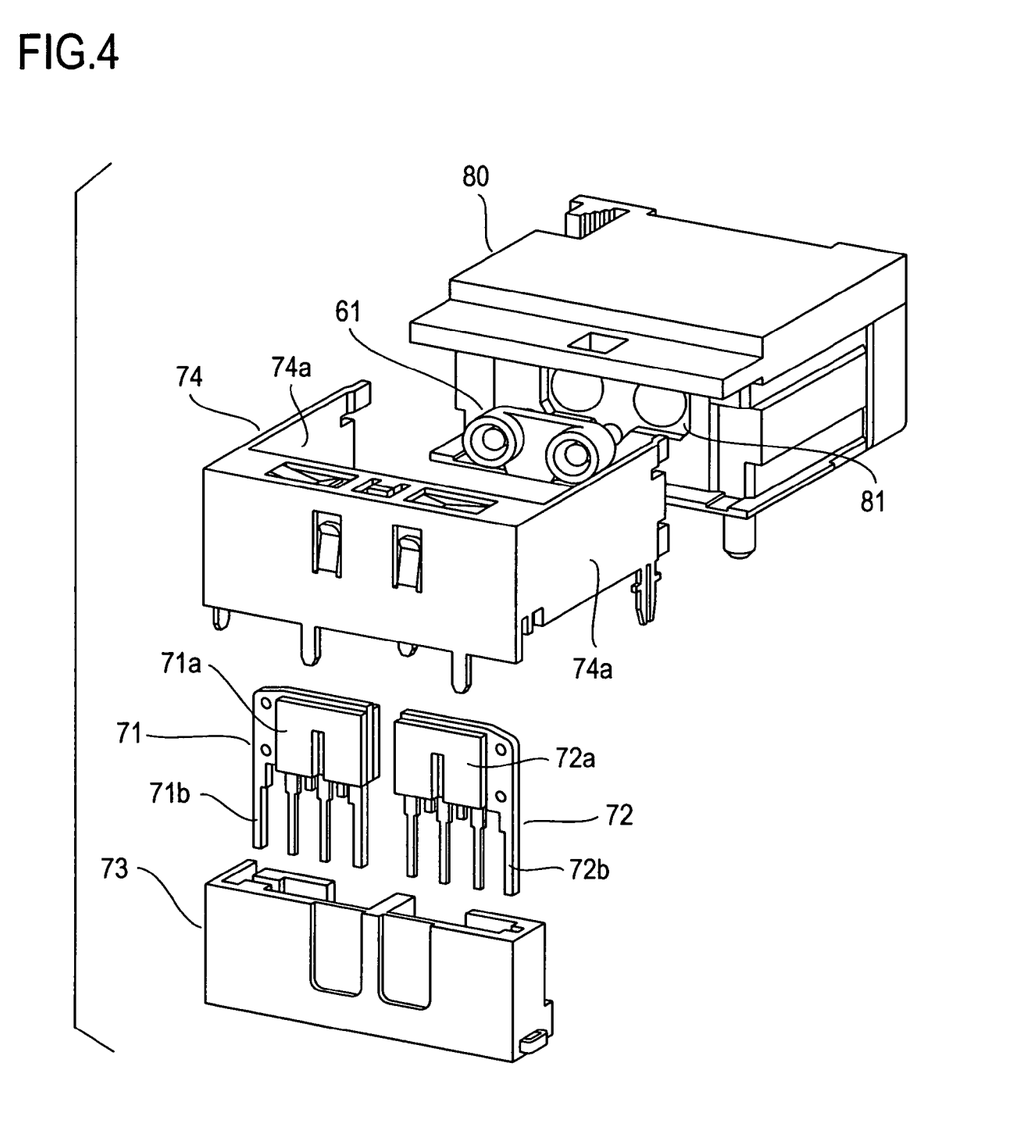
FIG. 4 is a perspective exploded view of the optical connector shown in FIGS. 3A and 3B.
Figure 5:
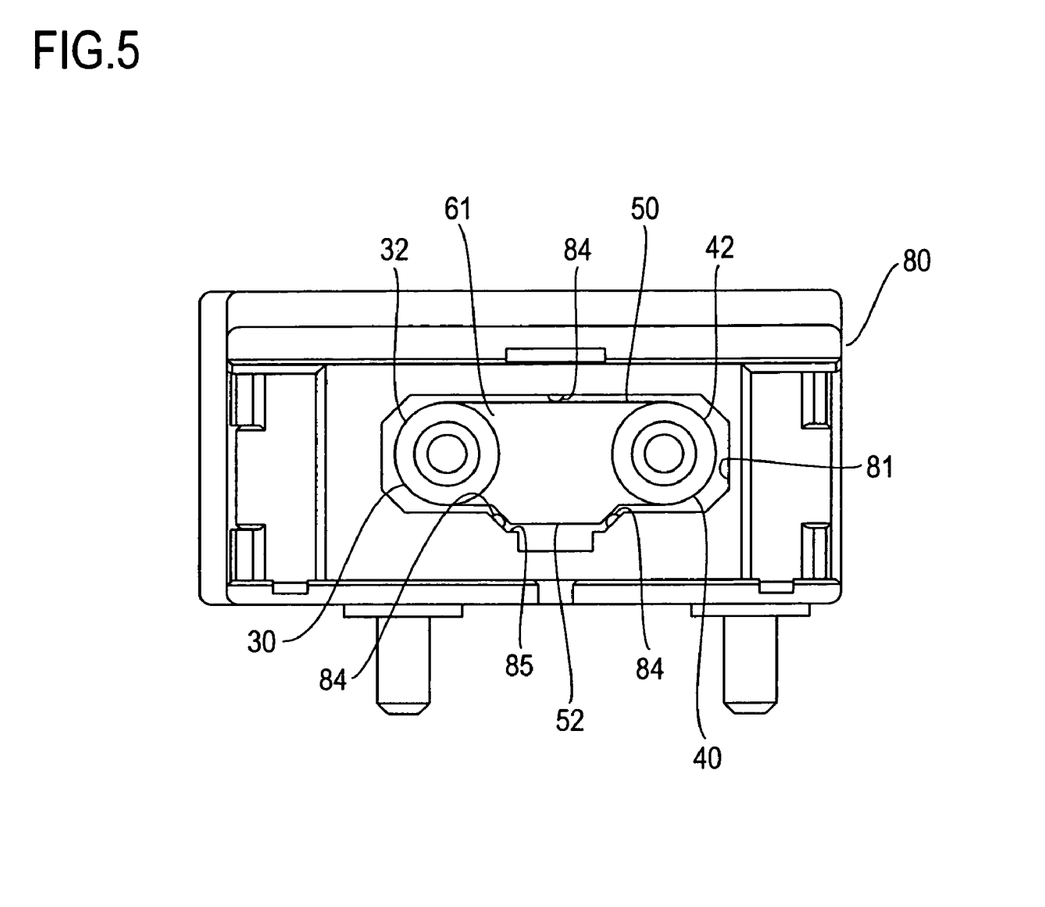
FIG. 5 is a rear view of the optical connector shown in FIGS. 3A and 3B with a part thereof removed for showing an essential structure thereof.

FIGS. 2A to 2D show a structure of a sleeve (a sleeve unit) of an optical connector according to an embodiment of the present invention. FIGS. 3A and 3B show external appearances of the optical connector incorporating the sleeve. FIG. 4 is an exploded view of the optical connector. Besides, FIG. 5 shows an attachment mechanism for the sleeve in detail. First, the structure of the sleeve will be described with reference to FIGS. 2A to 2D.

In this example, a transmission sleeve 30 and a reception sleeve 40 are connected to each other via a link section 50 to form a sleeve unit 61.

In this example, the transmission sleeve 30 is cylindrical and comprises an optically functional section (a waveguide) 31 having a lens 31a at each end, a flange 32 that surrounds one end of the optically functional section 31, and a pair of ribs 33 that project from an inner end face of the flange 32 toward the other end of the optically functional section 31 in parallel with the optically functional section 31. The paired ribs 33 are disposed at a predetermined distance, facing each other with the optically functional section 31 interposed therebetween. The ribs 33 have a planar inner surface and a cylindrical outer surface, and the cylindrical surface is flush with the outer periphery of the flange 32. The flange 32 has a recess 34 in an outer end face, in which said one end of the optically functional section 31 is positioned.

On the other hand, the reception sleeve 40 is also cylindrical and comprises an optically functional section (a waveguide) 41 having a lens 41a at each end, a flange 42 that surrounds one end of the optically functional section 41, and a pair of ribs 43 that project from an inner end face of the flange 42 toward the other end of the optically functional section 41 in parallel with the optically functional section 41. In this example, unlike the ribs 33, the ribs 43 have the shape of a flat plate and are aligned with each other with the optically functional section 41 interposed therebetween and connected to the optically functional section 41. The ribs 43 have a cylindrical outer side face, which is flush with the outer periphery of the flange 42. The flange 42 has a recess 44 in an outer end face, in which said one end of the optically functional section 41 is positioned.

The link section 50, which is provided between the flanges 32 and 42 and connects the flanges 32 and 42 to each other, is a flat plate extending from the inner ends of the flanges 32 and 42. In this example, a flat plate part 51 has a projection 52. The projection 52 is located at the middle of the flat plate part 51, extends from one edge thereof in the same plane therewith, and has the shape of a trapezoid.

The sleeve unit 61 structured as described above is integrally molded by resin molding, for example.

Now, with reference to FIG. 4, a structure of an optical connector will be described.

An optical connector 70 comprises a connector body 80 made of resin, the sleeve unit 61 described above, a light-emitting element module 71, a light-receiving element module 72, an element holder 73 and a shielding cover 74.

The light-emitting element module 71 and the light-receiving element module 72 have a light-emitting element and a light-receiving element encapsulated in a resin, respectively, and terminals of the light-emitting element and light-receiving element are drawn from the encapsulating resin. The light-emitting element may be a laser diode (LD), for example, and the light-receiving element may be a photo diode (PD), for example. In FIG. 4, reference numerals 71a and 72a denote an encapsulating resin, and reference numerals 71b and 72b denote terminals.

The light-emitting element module 71 and the light-receiving element module 72 are housed in and held by the element holder 73, and the element holder 73 is housed in and held by the shielding cover 74. The shielding cover 74 has a pair of locking sections 74a, which are locked to the side faces of the connector body 80 to fix the shielding cover 74 to the connector body 80 from the rear thereof. The connector body 80 has a recess 81 in the rear face thereof, and the sleeve unit 61 is inserted to the recess 81 so as to face the light-emitting face of the light-emitting element module 71 and the light-receiving face of the light-receiving element module 72.

The optical connector 70 assembled as described above has an external appearance as shown in FIGS. 3A and 3B. As shown in FIG. 3B, the connector body 80 has a recess 82 in the front face thereof, into which a counterpart optical plug is to be inserted, and a pair of receiving tubes 83 project from the bottom surface of the recess 82. The internal spaces of the receiving tubes 83 are opened, in the recess 81, to the rear of the connector body 80, as shown in FIG. 4.

Now, with reference to FIG. 5, a mechanism for attaching the sleeve unit 61 to the connector body 80 will be described in detail.

As shown in FIG. 5, the recess 81 formed in the rear face of the connector body 80 has a shape substantially the same as the contour of the sleeve unit 61 (specifically, the contour defined by the flanges 32 and 42 and the link section 50) and a size enough to accommodate the sleeve unit 61. In this example, the recess 81 has three ridges 84 formed on the side wall thereof. The ridges 84 extend in the depth direction of the recess 81 and are semicircular in cross section. One of the three ridges 84 is formed at the middle of the upper side of the recess 81, and the other two ridges 84 are formed on the opposing oblique sides of a depressed part 85 that is formed in the lower side of the recess 81 to accommodate the trapezoidal projection 52 of the link section 50 of the sleeve unit 61.

The sleeve unit 61 is fixed in the recess 81 by press-fitting the link section 50 into the recess 81 with the three ridges described above. Thus, the three ridges 84 abut against the link section 50 as shown in FIG. 5, thereby positioning and securing the link section 50.

Thus, in this example, a stress caused by press fitting of the sleeve unit 61 is exerted on the link section 50. In other words, any stress caused by the press fitting is not exerted on the optically functional sections 31 and 41 of the transmission sleeve 30 and the reception sleeve 40. Therefore, there can be avoided the problem that the optical function (optical property) of the optically functional sections 31 and 41 are compromised by the effect of the stress.

Figure 6:
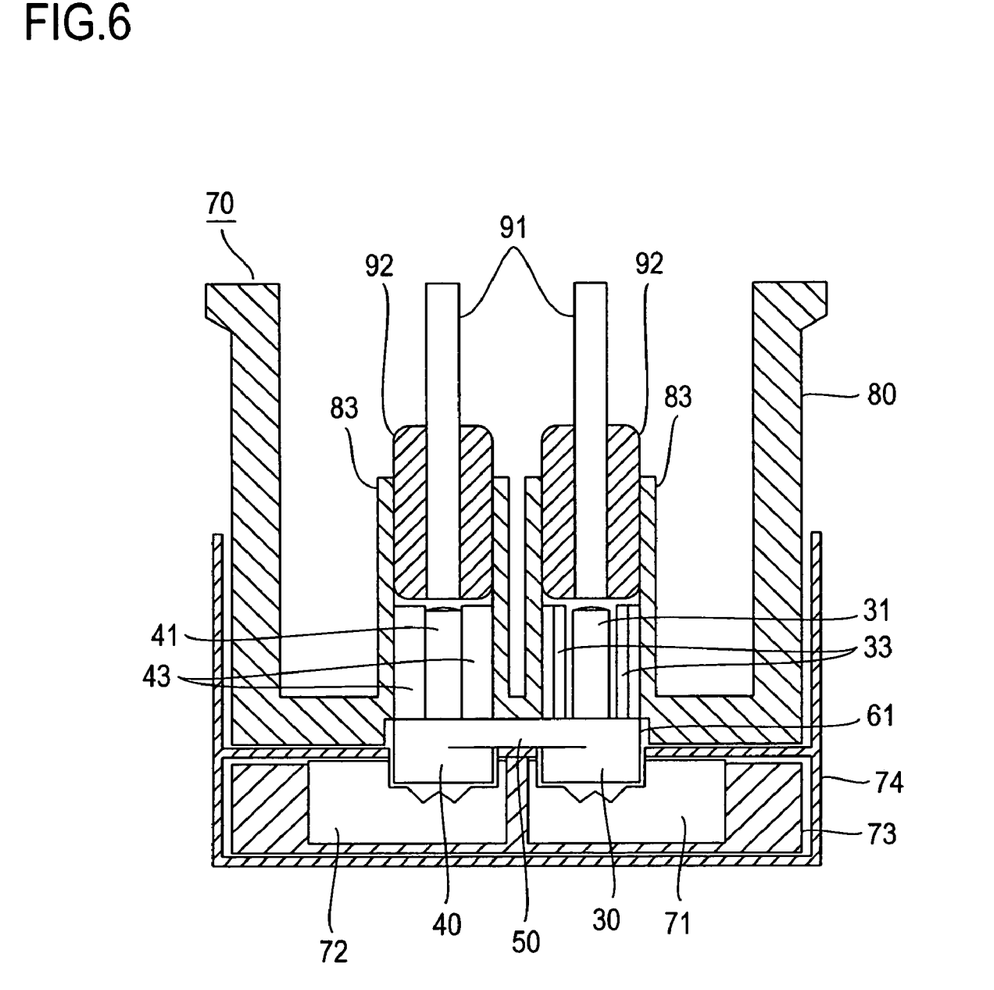
FIG. 6 is a schematic cross-sectional view of the optical connector shown in FIGS. 3A and 3B with ferrules each holding an optical fiber of a counterpart optical plug fitted and connected thereto.
Figure 7A:
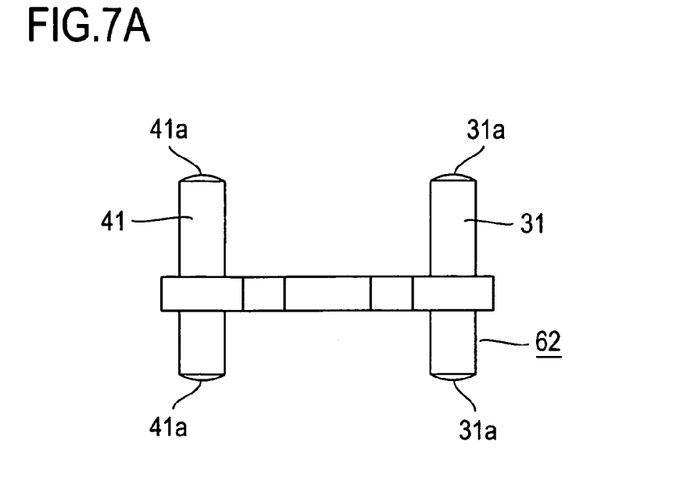
FIG. 7A is a plan view showing a basic structure (minimum structure) of the sleeve unit shown in FIG. 2A.
Figure 7B:
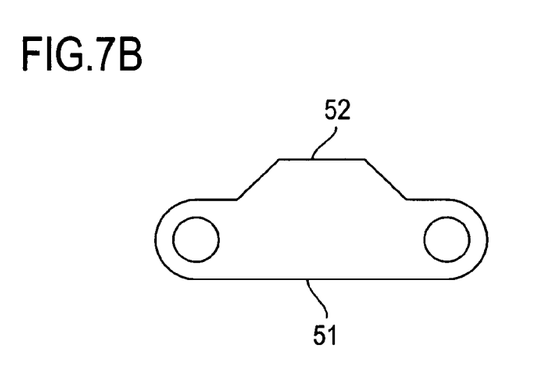
FIG. 7B is a front view of the sleeve unit shown in FIG. 7A.
Figure 7C:
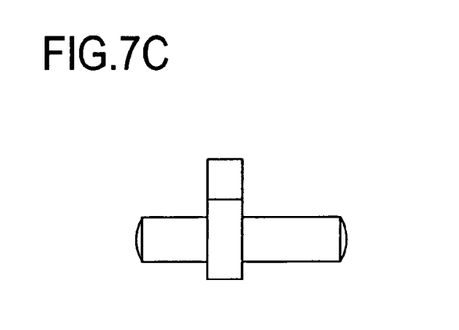
FIG. 7C is a right side view of the sleeve unit shown in FIG. 7B.
Figure 7D:
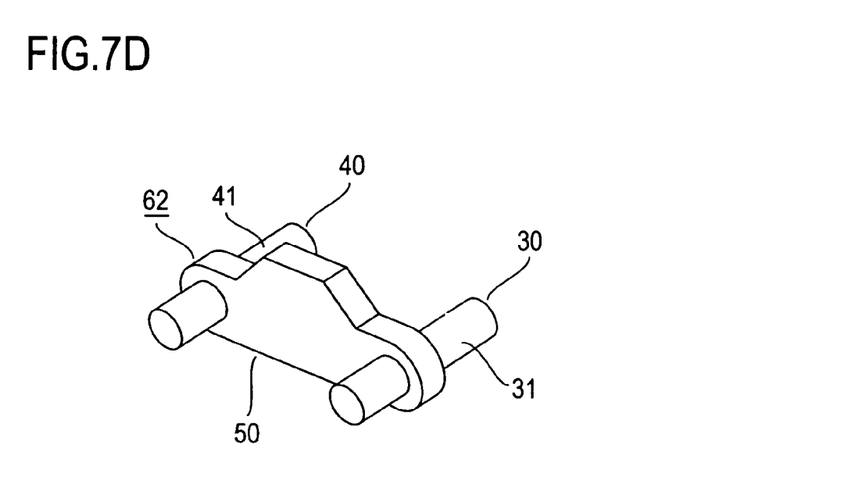
FIG. 7D is a perspective view of the sleeve unit shown in FIGS. 7A to 7C.
Figure 8A:
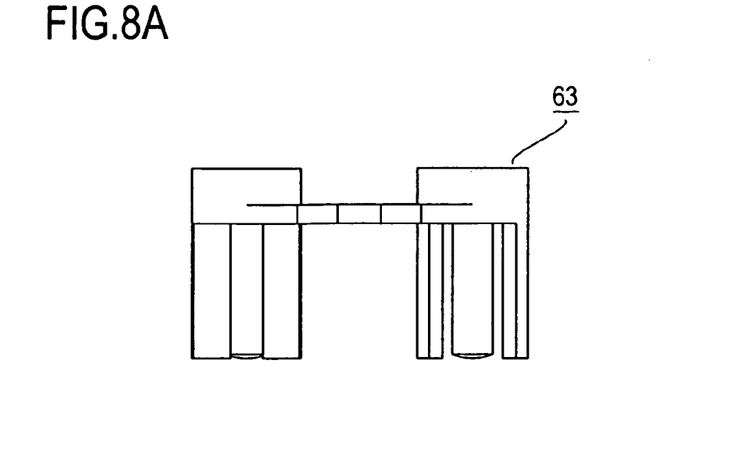
FIG. 8A is a plan view of a sleeve unit of an optical connector according to a second embodiment of the present invention.
Figure 8B:
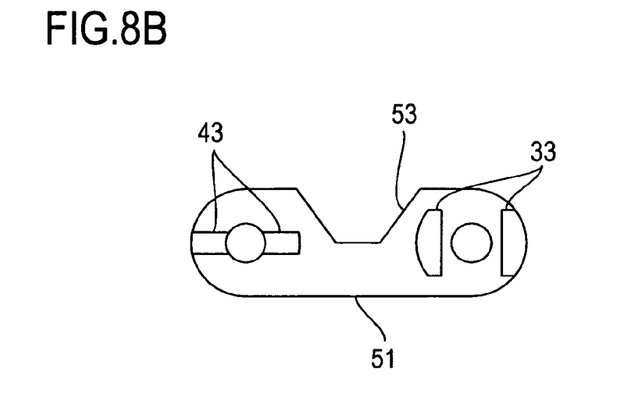
FIG. 8B is a front view of the sleeve unit shown in FIG. 8A.
Figure 8C:
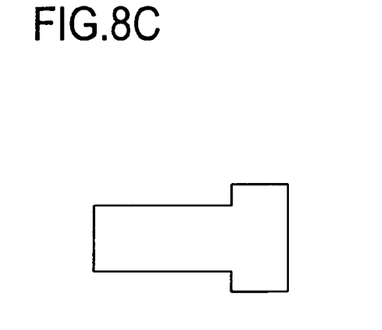
FIG. 8C is a right side view of the sleeve unit shown in FIG. 8B.
Figure 8D:
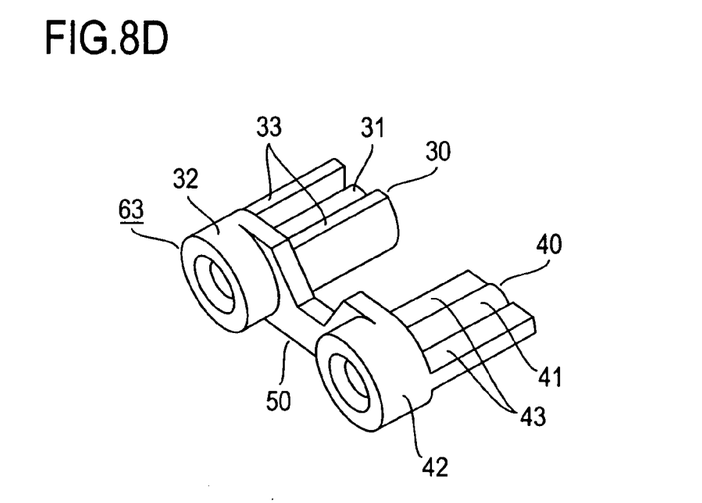
FIG. 8D is a perspective view of the sleeve unit shown in FIGS. 8A to 8C.
Figure 9A:
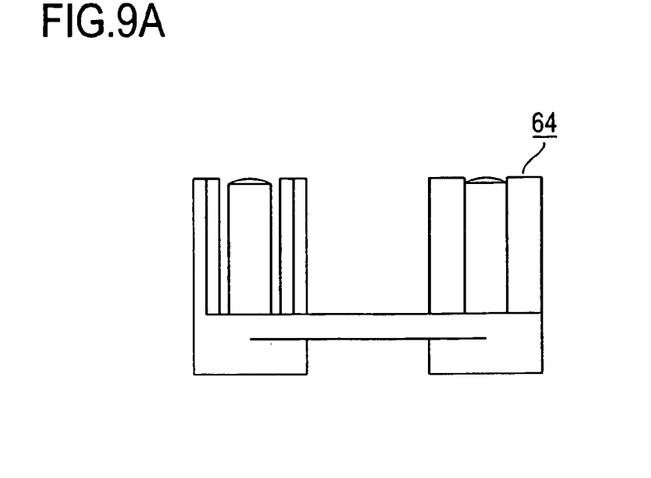
FIG. 9A is a plan view of a sleeve unit of an optical connector according to a third embodiment of the present invention.
Figure 9B:
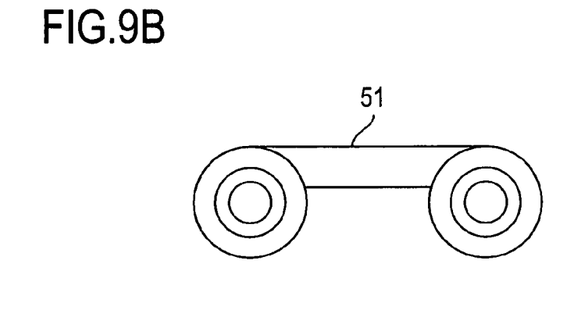
FIG. 9B is a front view of the sleeve unit shown in FIG. 9A.
Figure 9C:
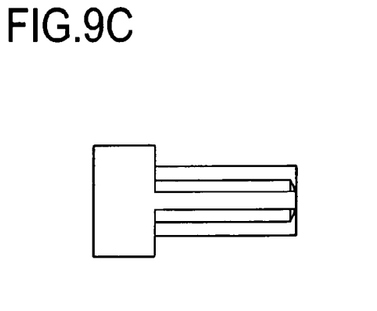
FIG. 9C is a right side view of the sleeve unit shown in FIG. 9B.
Figure 9D:
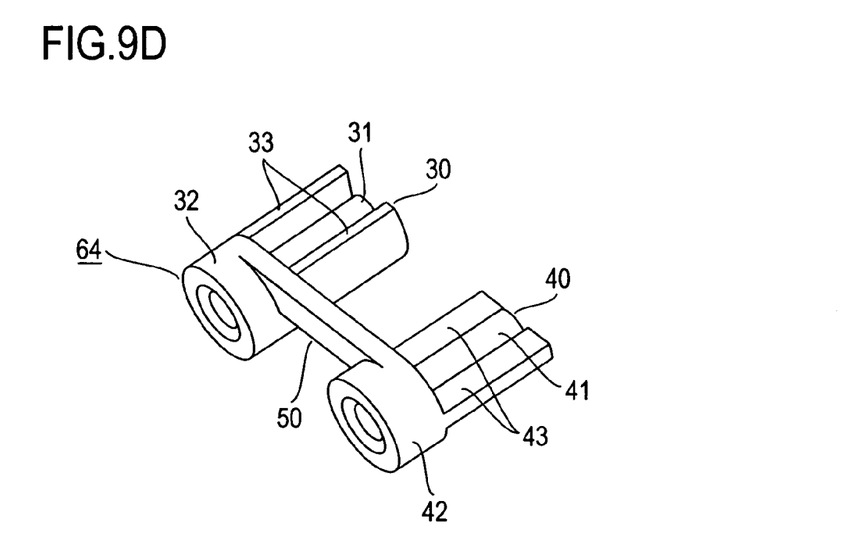
FIG. 9D is a perspective view of the sleeve unit shown in FIGS. 9A to 9C.
Figure 10A:
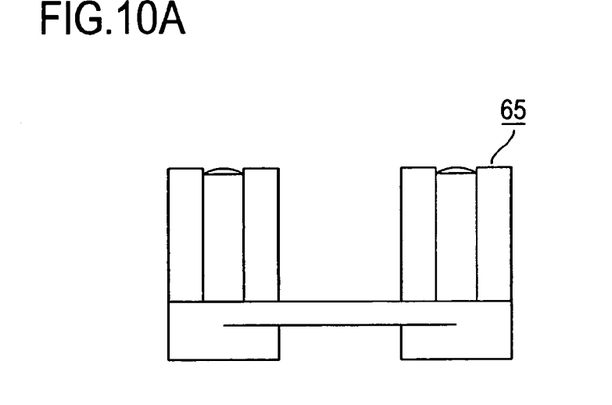
FIG. 10A is a plan view of a sleeve unit of an optical connector according to a fourth embodiment of the present invention.
Figure 10B:
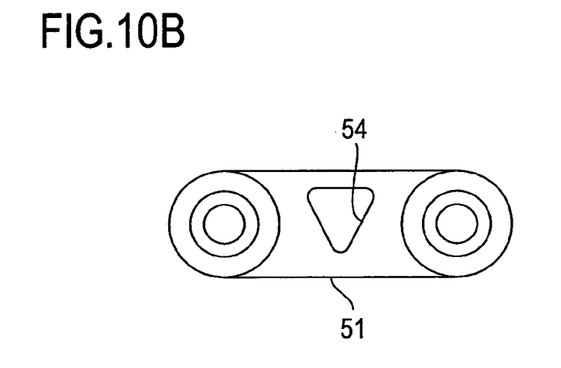
FIG. 10B is a front view of the sleeve unit shown in FIG. 10A.
Figure 10C:
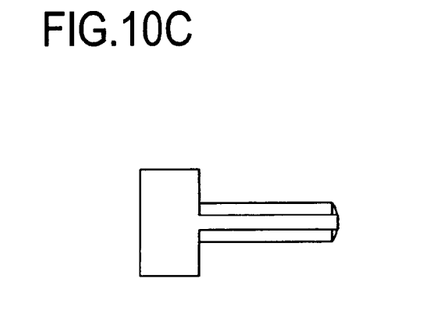
FIG. 10C is a right side view of the sleeve unit shown in FIG. 10B.
Figure 10D:
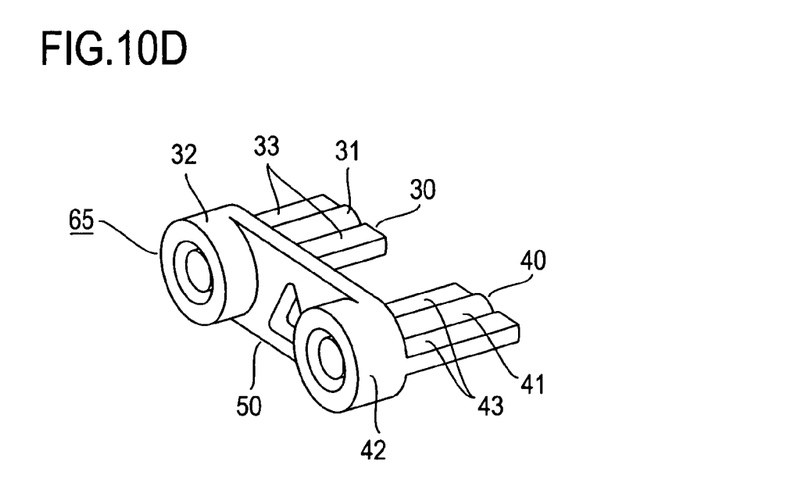
FIG. 10D is a perspective view of the sleeve unit shown in FIGS. 10A to 10C.

FIG. 6 is a schematic cross-sectional view of the optical connector 70 described above with a counterpart optical plug fitted and connected thereto. In FIG. 6, reference numeral 91 denotes optical fibers, reference numeral 92 denotes ferrules attached to the front end of the optical fibers 91. The other parts of the optical plug than the optical fibers 91 and the ferrules 92 are not shown in this drawing.

The optical fibers 91 held by the ferrules 92 and inserted to the receiving tubes 83 are optically connected to the light-emitting element module 71 and the light-receiving element module 72 via the optically functional sections 31 and 41 of the sleeve unit 61, respectively.

In this example, the transmission sleeve 30 and the reception sleeve 40 of the sleeve unit 61 have the ribs 33 and 43, respectively. The ribs 33 and 43 are provided in order to protect the optically functional sections 31 and 41. Although the ribs 33 and 43 are positioned in the receiving tubes 83 as shown in FIG. 6, they are slightly spaced apart from the receiving tubes 83, so that the ribs 33 and 43 are not pressed against the receiving tubes 83.

On the other hand, for example, even if some damage occurs in the link section 50 that serves for positioning of the sleeve unit 61 and compromises the positioning capability of the link section 50, the ribs 33 and 43 can prevent the sleeve unit 61 from be significantly displaced, so that the optical function of the sleeve unit 61 can be maintained. That is, the ribs 33 and 43 can serve as auxiliary positioning means and prevent the optically functional sections 31 and 41 from becoming significantly misaligned.

FIGS. 7A to 7D shows another structure of the sleeve unit. In this example, a transmission sleeve 30 and a reception sleeve 40 are composed only of cylindrical optically functional sections 31 and 41, respectively. In other words, the flanges 32 and 42 and the ribs 33 and 43 for protecting the optically functional sections are eliminated from the structure shown in FIGS. 2A to 2D.

A sleeve unit 62 shown in FIGS. 7A to 7D has a link section 50 similar to that of the sleeve unit 61 shown in FIGS. 2A to 2D. Thus, FIGS. 7A to 7D show a minimum structure (a basic structure) of the sleeve unit of a type the link section 50 is press-fitted.

In the example described above, the link section 50 of the sleeve unit comprises the flat plate part 51 with the projection 52, and the projection 52 abuts against the ridges 84 formed on the connector body 80 to position the sleeve unit. However, the shape of the link section 50 is not limited thereto, and the link section 50 may have other shapes.

FIGS. 8A to 8D, FIGS. 9A to 9D and FIGS. 10A to 10D show various shapes of the link section 50. In FIGS. 8A to 8D, the flat plate part 51 of the link section 50 has a trapezoidal notch 53. In FIGS. 9A to 9D, the link section 50 is composed of a narrowed flat plate part 51, which connects the flanges 32 and 42 to each other not at the entire inner sides thereof but at parts of the inner sides thereof. In FIGS. 10A to 10D, the flat plate part 51 has a polygonal, or specifically triangular, opening 54.

Figure 11:
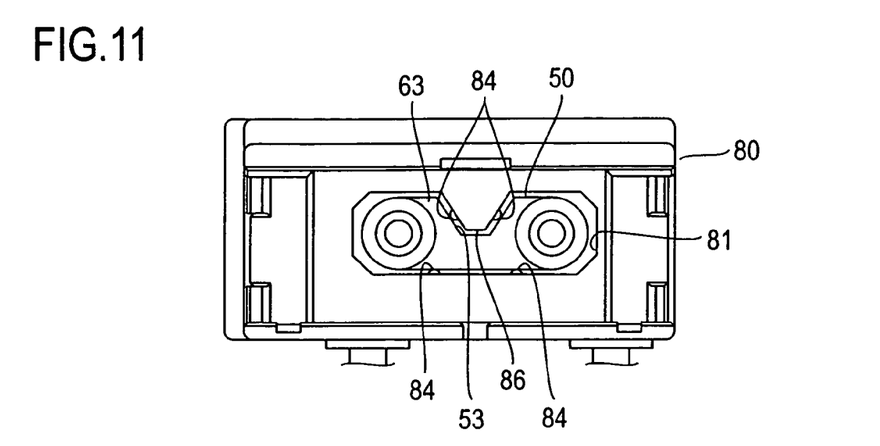
FIG. 11 is a rear view of the optical connector according to the second embodiment of the present invention with a part thereof removed for showing an essential structure thereof.
Figure 12:
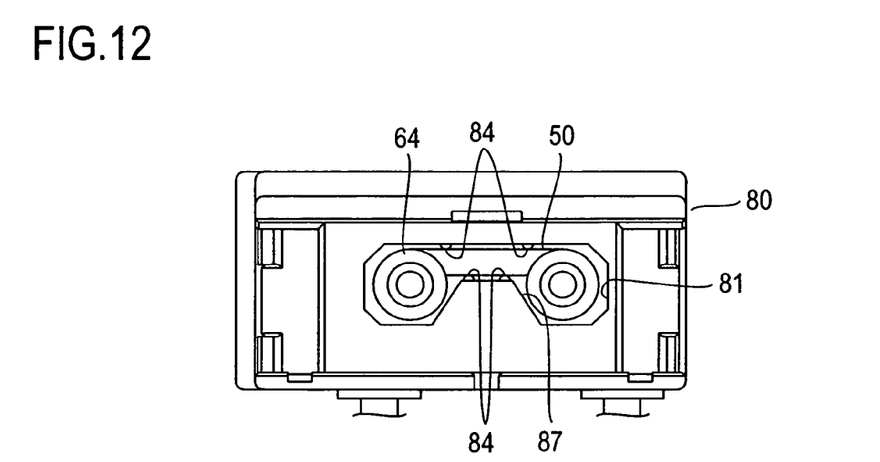
FIG. 12 is a rear view of the optical connector according to the third embodiment of the present invention with a part thereof removed for showing an essential structure thereof.
Figure 13:
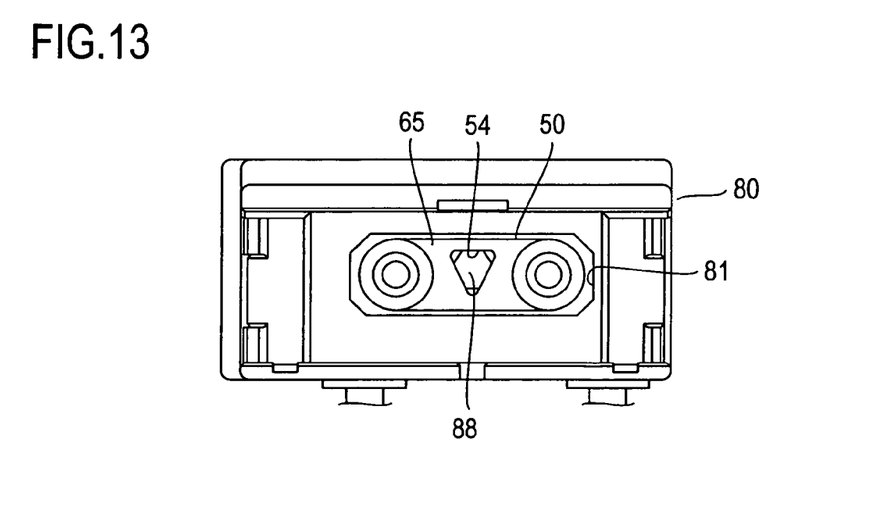
FIG. 13 is a rear view of the optical connector according to the fourth embodiment of the present invention with a part thereof removed for showing an essential structure thereof.
Figure 14A:
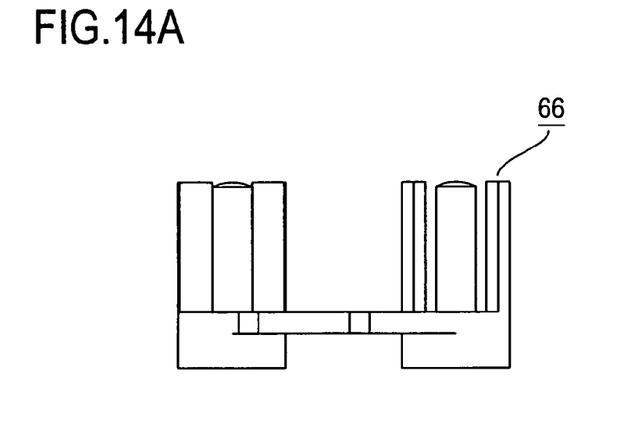
FIG. 14A is a plan view of a sleeve unit of an optical connector according to a fifth embodiment of the present invention.
Figure 14B:
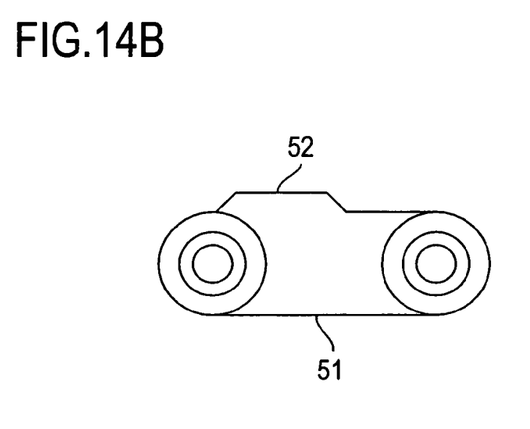
FIG. 14B is a front view of the sleeve unit shown in FIG. 14A.
Figure 14C:
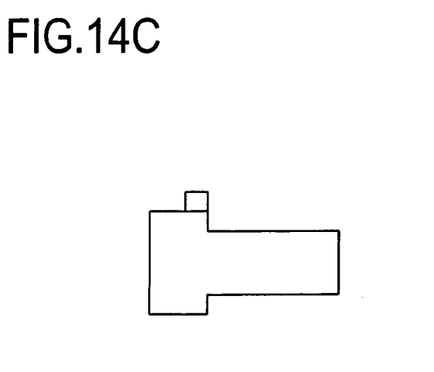
FIG. 14C is a right side view of the sleeve unit shown in FIG. 14B.
Figure 14D:
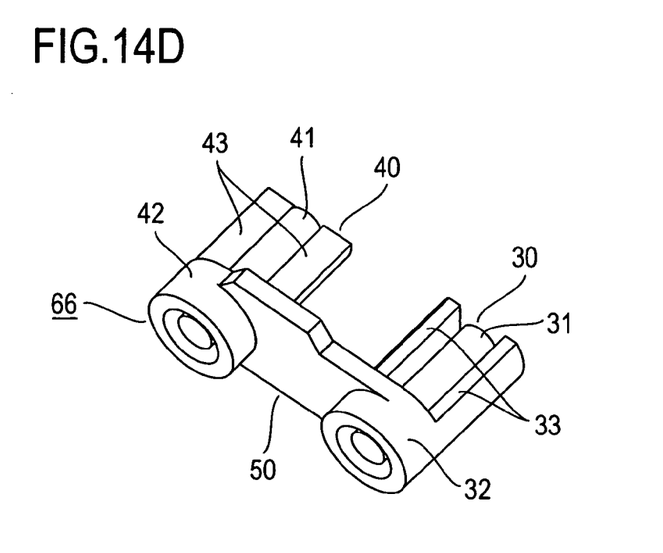
FIG. 14D is a perspective view of the sleeve unit shown in FIGS. 14A to 14C.

FIGS. 11 to 13 show mechanisms for press-fitting a sleeve unit 63 shown in FIGS. 8A to 8D, a sleeve unit 64 shown in FIGS. 9A to 9D and a sleeve unit 65 shown in FIGS. 10A to 10D into the connector body 80, respectively.

Referring to FIG. 11, at the middle of the upper side of the recess 81 formed in the rear face of the connector body 80, a trapezoidal projection 86 corresponding to the notch 53 in the link section 50 of the sleeve unit 63 is formed. A ridge 84 is formed on each of the opposing oblique sides of the trapezoidal projection 86, and two ridges 84 are further formed on the lower side of the recess 81. The link section 50 of the sleeve unit 63 abuts against the four ridges 84 on the side wall of the recess 81, thereby being positioned and secured.

Referring to FIG. 12, a trapezoidal projection 87 is formed at the middle of the lower side of the recess 81, so that the middle part of the recess 81 is narrowed to the width of the narrowed link section 50 of the sleeve unit 64. Two ridges 84 are formed on the upper side of the trapezoidal projection 87, and two ridges 84 are further formed on the upper side of the recess 81. The link section 50 abuts against the four ridges 84, thereby being positioned and secured.

On the other hand, referring to FIG. 13, a triangular projection 88 that is fitted into the triangular opening 54 of the sleeve unit 65 is formed in the recess 81. The link section 50 of the sleeve unit 65 is positioned and secured by press-fitting the projection 88 into the triangular opening 54.

All the attachment mechanisms shown in FIGS. 11 to 13 are designed to position and secure the sleeve unit by press fitting of the link section 50. Therefore, a stress caused by the press fitting is not exerted on the optically functional section 31 and 41 of the transmission sleeve 30 and the reception sleeve 40.

In any of the sleeve units 61 to 65, the link section 50 that connects the transmission sleeve 30 and the reception sleeve 40 to each other has the shape of a thin flat plate, and the thin link section 50 serves to suppress the crosstalk from the transmission side to the reception side through the link section 50. If a polygonal opening, such as the triangular opening 54 of the sleeve unit 65 shown in FIGS. 10A to 10D, is formed in the link section 50, the crosstalk can be further suppressed.

In any of the examples described above, the link section 50 of the sleeve unit 61 to 65 is asymmetrical with respect to a center line extending in parallel with the optical axes of the transmission sleeve 30 and the reception sleeve and passing through the midpoint between the optical axes, and the recess 81 of the connector body 80 has a shape corresponding to that of the link section 50. Thus, when incorporating the sleeve unit 61 to 65 into the connector body 80, confusion between the transmission sleeve 30 and the reception sleeve 40 can be avoided.

For example, in the case of the sleeve unit 62 with neither flange nor rib shown in FIGS. 7A to 7D, confusion between the front and the rear of the sleeve unit 62 particularly tends to arise. In order to avoid such confusion, the projection 52 of the link section 50 can be displaced from the middle of the link section 50, and the depressed part 85 in the recess 81 of the connector body 80 can be displaced accordingly.

That is, if the shape of the link section 50 is asymmetrical with respect to a first plane containing the optical axes of the transmission sleeve 30 and the reception sleeve 40 and a second plane that is perpendicular to the first plane and contains the center line extending in parallel with the optical axes and passing through the midpoint between the optical axes, confusion between the front and the rear of the sleeve unit or between the left and right of the sleeve unit can be avoided, and the sleeve unit can be prevented from being inserted to the connector body in a wrong orientation.

Figure 15:
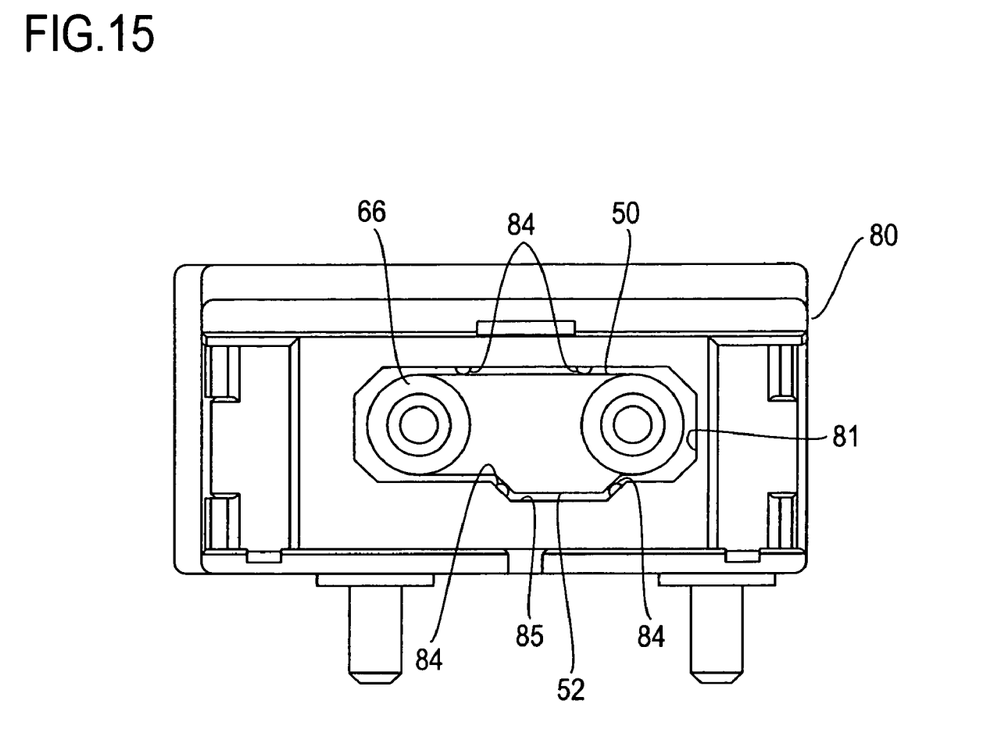
FIG. 15 is a rear view of the optical connector according to the fifth embodiment of the present invention with a part thereof removed for showing an essential structure thereof.

FIGS. 14A to 14D show a structure of a sleeve unit that is designed to avoid such wrong insertion. The projection 52 of the link section 50 of a sleeve unit 66 shown in FIGS. 14A to 14D is similar to the projection 52 of the link section 50 of the sleeve unit 61 shown in FIGS. 2A to 2D but is displaced from the middle of the link section 50 toward the reception sleeve 40. FIG. 15 shows the sleeve unit 66 press-fitted into the connector body 80. The depressed part 85 in the recess 81 of the connector body 80 is displaced from the middle of the recess 81 so as to be aligned with the projection 52 of the link section 50 of the sleeve unit 66.

What is claimed is:

1. An optical connector to be connected to an optical plug holding optical fibers, comprising:
   a connector body having a recess formed in a front face thereof for receiving there into the optical plug and two receiving tubes formed inside said recess integrally with said connector body for receiving there into two optical fibers of the optical plug;
   a light-emitting element;
   a light-receiving element;
   a transmission sleeve and a reception sleeve inserted in said two receiving tubes for optically connecting the light-emitting element and the light-receiving element to optical fibers of said optical plug, respectively,
   a link section for connecting said transmission sleeve and said reception sleeve to each other to form a sleeve unit, and
   wherein said sleeve unit is secured by a portion of said link section fitted into said connector body.

2. The optical connector according to claim 1, wherein said link section is inserted to and positioned in another recess formed in said connector body, and
   a plurality of ridges formed on the side wall of said another recess abut against said link section to position and secure said link section.

3. The optical connector according to claim 2, wherein said link section has a projection or notch that abuts against said ridges and is positioned.

4. The optical connector according to claim 1, wherein said link section has a polygonal opening, and a polygonal projection formed on said connector body is press-fitted into and secured in the polygonal opening.

5. The optical connector according to any of claims 1 to 4, wherein said link section is asymmetrical with respect to a center line extending in parallel with optical axes of said transmission sleeve and said reception sleeve and passing through the midpoint between the optical axes.

6. The optical connector according to any of claim 1 to 4, wherein said link section is asymmetrical with respect to a first plane containing optical axes of said transmission sleeve and said reception sleeve and a second plane that is perpendicular to the first plane and contains a center line extending in parallel with said optical axes and passing through the midpoint between the optical axes.

* * * * *